United States Patent
Jiang et al.

(10) Patent No.: US 9,726,511 B2
(45) Date of Patent: Aug. 8, 2017

(54) NAVIGATION SYSTEM WITH DESTINATION SELECTION MECHANISM AND METHOD OF OPERATION THEREOF

(71) Applicant: Telenav, Inc., Sunnyvale, CA (US)

(72) Inventors: Changzheng Jiang, Santa Clara, CA (US); Kumar Maddali, San Ramon, CA (US); Maneesha Jain, Los Gatos, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/539,932

(22) Filed: Nov. 12, 2014

(65) Prior Publication Data
US 2015/0134237 A1    May 14, 2015

Related U.S. Application Data

(60) Provisional application No. 61/903,018, filed on Nov. 12, 2013.

(51) Int. Cl.
G01C 21/36    (2006.01)

(52) U.S. Cl.
CPC ...... *G01C 21/3611* (2013.01); *G01C 21/3679* (2013.01)

(58) Field of Classification Search
CPC .................................................. G01C 21/3423
See application file for complete search history.

(56) References Cited

U.S. PATENT DOCUMENTS

| | | | |
|---|---|---|---|
| 6,144,318 A | 11/2000 | Hayashi et al. | |
| 6,480,786 B2 | 11/2002 | Watanabe et al. | |
| 6,728,635 B2 | 4/2004 | Hamada et al. | |
| 6,766,245 B2 | 7/2004 | Padmanabhan | |
| 6,820,005 B2 | 11/2004 | Matsuda et al. | |
| 7,080,018 B1 * | 7/2006 | Fox | G06Q 30/02 705/14.5 |
| 2002/0042819 A1 * | 4/2002 | Reichert | G06F 17/3087 709/217 |
| 2008/0052000 A1 | 2/2008 | Furstenberg | |
| 2008/0052105 A1 | 2/2008 | Jin et al. | |
| 2010/0070165 A1 | 3/2010 | Kang | |
| 2011/0264520 A1 * | 10/2011 | Puhakka | G01C 21/206 705/14.49 |
| 2013/0103697 A1 * | 4/2013 | Hill | G06F 17/30312 707/748 |
| 2014/0032109 A1 * | 1/2014 | Hsieh | G01C 21/34 701/533 |

* cited by examiner

*Primary Examiner* — Genna Mott
(74) *Attorney, Agent, or Firm* — IP Investment Law Group

(57) ABSTRACT

A method of operation of a navigation system includes: determining candidate locations for the location query; determining a candidate associated location specific to each of the candidate locations; determining a waypoint destination from an instance of the candidate locations based on a selected instance of the candidate associated location specific to the instance of the candidate locations; and calculating a travel route including the waypoint destination and the selected instance of the candidate associated location for displaying on a device.

20 Claims, 5 Drawing Sheets

NAVIGATION SYSTEM WITH DESTINATION SELECTION MECHANISM AND METHOD OF OPERATION THEREOF

CROSS-REFERENCE TO RELATED APPLICATION(S)

This application claims the benefit of U.S. Provisional Patent Application Ser. No. 61/903,018 filed Nov. 12, 2013, and the subject matter thereof is incorporated herein by reference thereto.

TECHNICAL FIELD

An embodiment of the present invention relates generally to a navigation system, and more particularly to a system for destination selection.

BACKGROUND

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without destination selection mechanism has become a paramount concern for the consumer. The inability decreases the benefit of using the tool.

Thus, a need still remains for a navigation system with destination selection mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including: a user interface configured to receive a location query; a control unit, coupled to the user interface, configured to: determine candidate locations for the location query; determine a candidate associated location specific to each of the candidate locations; determine a waypoint destination from an instance of the candidate locations based on a selected instance of the candidate associated location specific to the instance of the candidate locations; and calculate a travel route including the waypoint destination and the selected instance of the candidate associated location for displaying on a device.

An embodiment of the present invention provides a method including: determining candidate locations for the location query; determining a candidate associated location specific to each of the candidate locations; determining a waypoint destination from an instance of the candidate locations based on a selected instance of the candidate associated location specific to the instance of the candidate locations; and calculating a travel route including the waypoint destination and the selected instance of the candidate associated location for displaying on a device.

An embodiment of the present invention provides a non-transitory computer readable medium including instructions for operating a navigation system including: determining candidate locations for the location query; determining a candidate associated location specific to each of the candidate locations; determining a waypoint destination from an instance of the candidate locations based on a selected instance of the candidate associated location specific to the instance of the candidate locations; and calculating a travel route including the waypoint destination and the selected instance of the candidate associated location for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
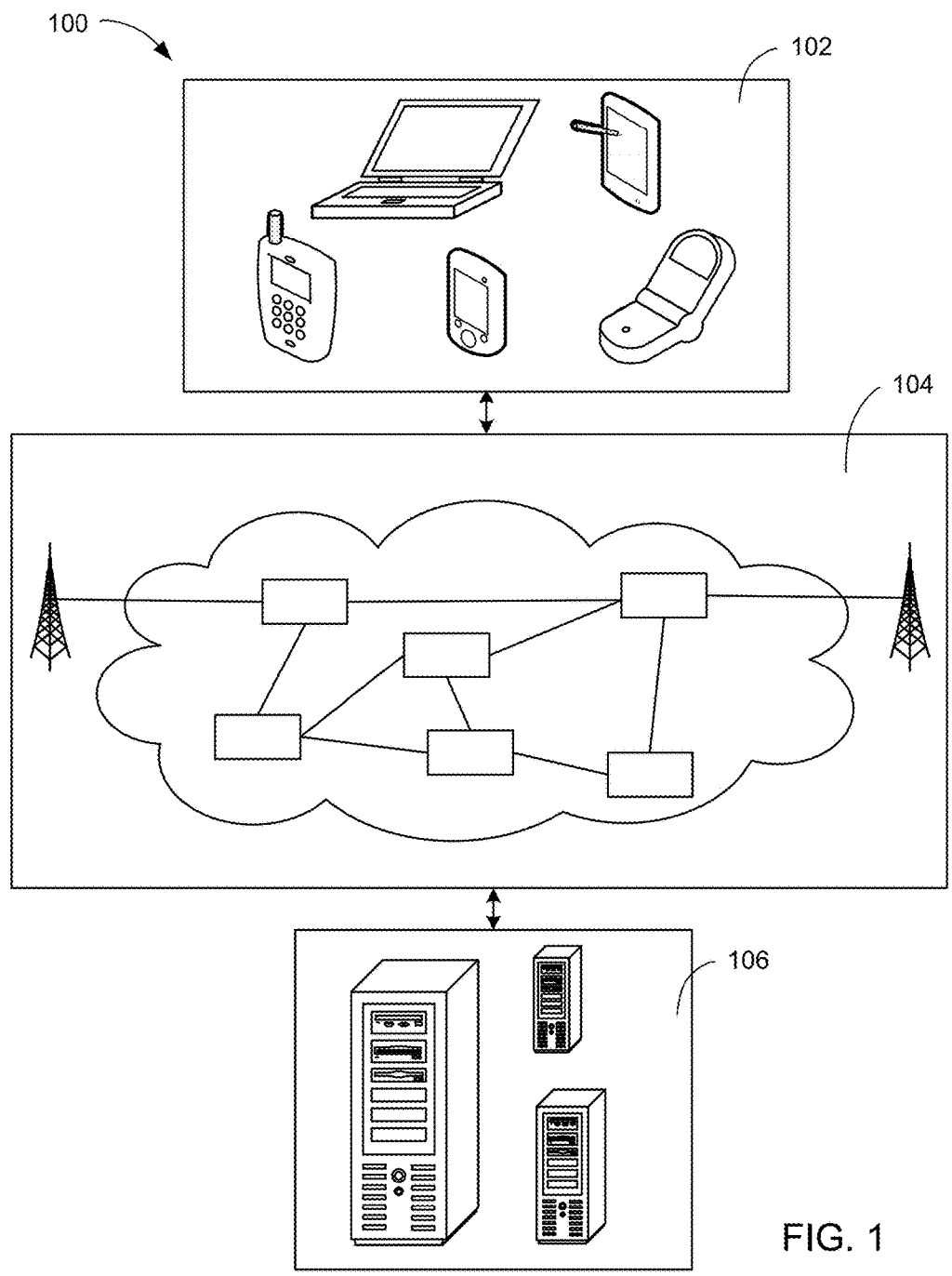
FIG. 1 is a navigation system with destination selection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X, Y); where X and Y are two coordinates that define the location of a pixel in an image.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with destination selection mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
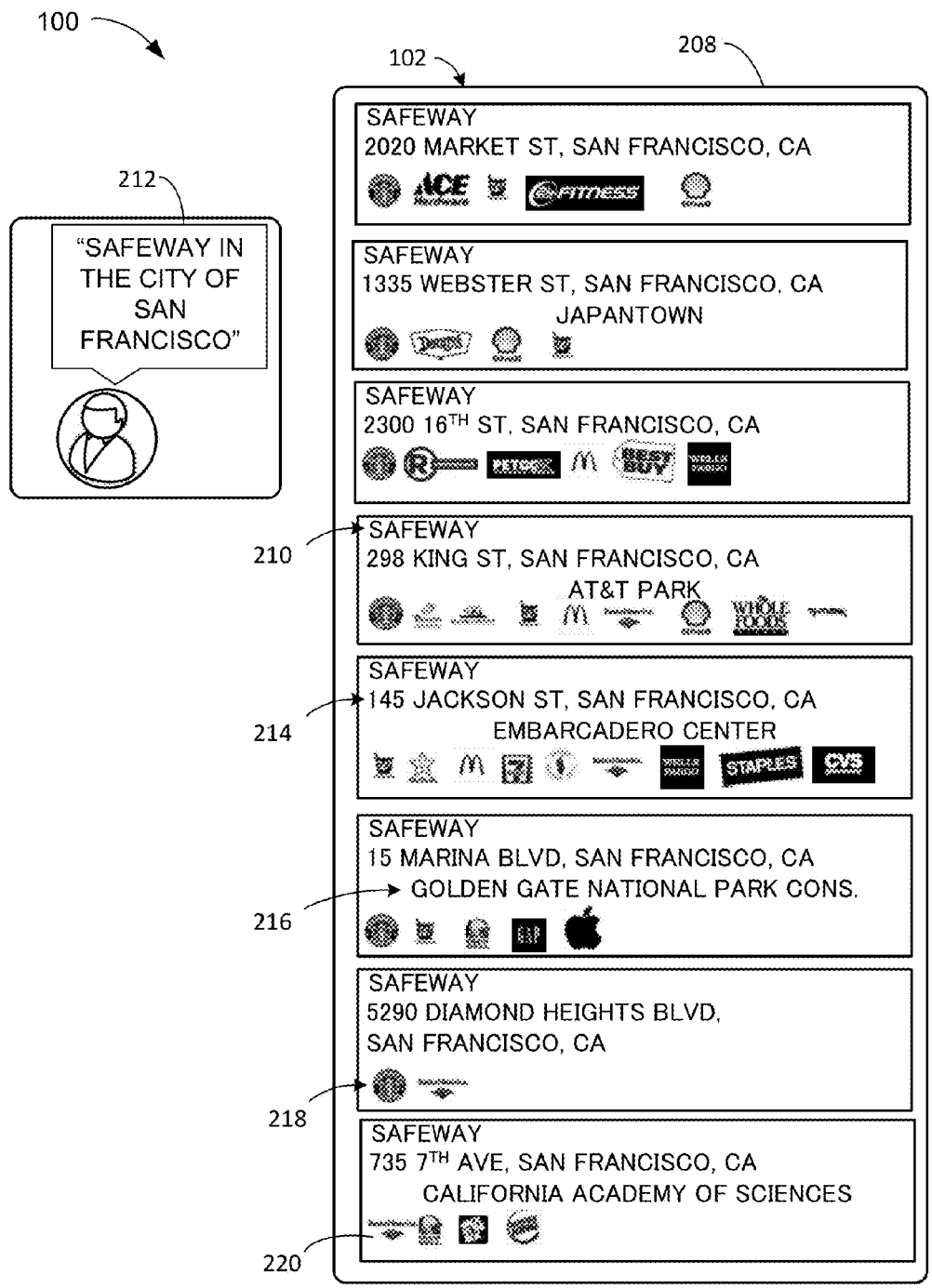
FIG. 2 is an example of a display interface of the first device of FIG. 1.

Referring now to FIG. 2, therein is shown an example of a display interface 208 for the first device 102 of FIG. 1. The display interface 208 depicts one or more candidate locations 210 for a location query 212 made by a location requestor. The location query 212 is defined as a request to search for a specific or general location. For example, the location query 212 can be a query for a general location, such as a request to locate a grocery store or a department store. As another example, the location query 212 can be a query for a specific location, such as a "Safeway" or "Macy's".

The candidate locations 210 are defined as one or more locations matching the description of a requested location. For example, the candidate locations 210 can include one or more instances of locations specified by the location query 212. As a specific example, when the location query 212 is for "Safeway in the city of San Francisco", the candidate locations 210 can include one or more "Safeway" locations, as depicted in FIG. 2. The navigation system 100 can include and display location information 214 associated with the candidate locations 210, such as the address or hours of operation, on the display interface.

For illustrative purposes, for each instance of the candidate locations 210 displayed on the display interface 102, the location query 212 of "Safeway" can appear as the first line of text followed by the location information 214 as the second line of text appearing below the text or indicator representing the instance of the candidate locations 210, although it is understood that the location query 212 and the location information 214 can be arranged differently. For example, the location query 212 and the location information 214 can be displayed side by side on the same line of text.

The navigation system 100 can include neighboring prominent locations 216 associated with one of the candidate locations 210. The neighboring prominent locations 216 are defined as a locations or an area that can be easily recognized or identified. The neighboring prominent locations 216 can be locations that are easily recognizable by the location requestor. For example, the neighboring prominent locations 216 can be a landmark, such as AT&T Park, a local attraction, such as the California Academy of Sciences or Golden Gate National Park Conservancy in San Francisco, a shopping or commerce center, or neighborhood, such as Japan Town.

As an example, FIG. 2 illustrates the navigation system 100 displaying the candidate locations 210 for the location query 212 of "Safeway" stores near San Francisco, Calif. The display interface 208 can show or display the location information 214, including brand, street address and city, for each of the candidate locations 210. In addition, where applicable, the navigation system 100 can include one or more of the neighboring prominent locations 216 associated with a particular instance of the candidate locations 210 of the "Safeway" stores. As depicted in FIG. 2 the second, fourth, fifth, and sixth instances of the candidate locations 210 includes the neighboring prominent locations 216 of Japan Town, AT&T Park, Embarcadero Center, and Golden Gate National Park Conservancy, respectively.

The navigation system 100 can include one or more candidate associated locations 218 associated with instances of the candidate locations 210. The candidate associated locations 218 are defined as locations near the requested location that can be of interest to the requestor of the location. The candidate associated locations 218 are specific to each one of the candidate locations 210. More specifically, each of the candidate associated locations 218 are locations that are near a specific instance of the candidate locations 210.

The candidate associated locations 218 can be locations within a specified or predetermined distance from the candidate locations 210. For example, the predetermined or specified distance can be determined by travel time, such as a five or ten minute walking or driving distance, convenience of travel, such as locations within the same shopping complex or with shared parking lots or structures.

The candidate associated locations 218 can be associated with candidate locations 210 in a number of different ways. For example, the candidate associated locations 218 can be brand locations, stores, or establishments that are preferred by the location requestor, a location that is near an appointment for the location requestor, popular or well-known brands, or stores near, one of the candidate locations 210, the neighboring prominent location, or a combination thereof. As a specific example, the candidate associated locations can be the dental office, clinic, daycare center, school, office for the location requestor or an individual related to the location requestor, such as child, friend, family member, or relative. In another specific example, the candidate associated locations 218 can be popular or well-known brands, stores, or restaurants, such as "McDonalds", "Starbucks", "Walgreens" "GAP", "Wells Fargo", "Shell Gasoline", as illustrated in FIG. 2.

The navigation system 100 can be presented or displayed with a brand icon 220 of the candidate associated locations 218. The brand icon 220 is defined as the trademark image or text, associated with or representing the candidate associated locations 218. For example, the brand icon 220 can be the registered trademark or logo, such as the golden arches icon for "McDonalds." The navigation system 100 can present the various numbers of the brand icon 220 depending on the factors, such as display preferences of the location requestor or based on the available number of the candidate associated locations 218 near the candidate locations 210.

For illustrative purposes, when the neighboring prominent locations 216 are identified for one of the candidate locations 210, the neighboring prominent locations 216 can be displayed with the location information 214 and the brand icon 220 representing the candidate associated locations 218, as shown in second, fourth, fifth, sixth, and eight instances of the candidate locations 210, although it is understood that the neighboring prominent locations 216 and the brand icon 220 can be arranged differently. For example, the brand icon 220 for the candidate associated locations 218 can be displayed in the line before any applicable instances of the neighboring prominent locations 216.

The location requestor can select one of the candidate locations 210 as a preferred destination based on the neighboring prominent locations 216, the candidate associated locations 218, or a combination thereof. For example, the location requestor can select the preferred destination as one of the candidate locations 210 based on the instance of the neighboring prominent locations 216 that is specific to selected instance of the candidate locations 210 when the location requestor prefers to travel based on ease of identification or recognition. In another example, the location requestor can select the preferred destination based on the instance of the candidate associated locations 218 specific to the selected instance of the candidate locations 210 when the location requestor prefers to include the specific instance of the candidate associated locations 218 in addition to the preferred destination.

For illustrative purposes, the candidate locations 210, location information 214, the candidate associated locations 218, and the neighboring prominent locations 216 are presented in a list format, although it is understood that the candidate locations 210, the candidate associated locations 218, and the neighboring prominent locations 216 can be presented differently. For example, the candidate locations 210 can be presented on a map as markers or callout boxes depicting the position or coordinates of the candidate locations 210. To continue the example, the markers or callout boxes for the instances of the candidate locations 210 can include the location information 214, the candidate associated locations 218, and the neighboring prominent locations 216 specific to the candidate locations 210.

Figure 3:
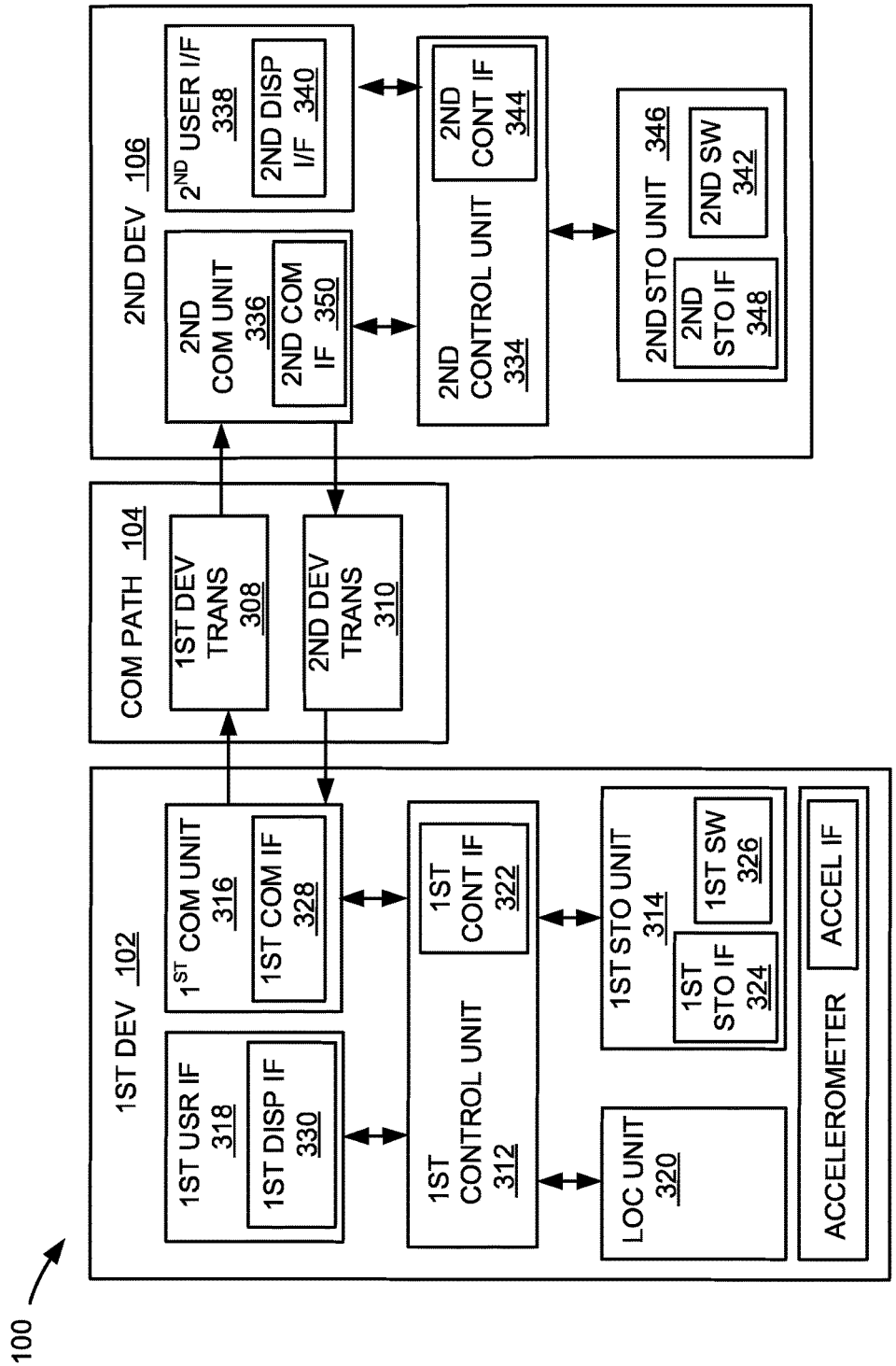
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
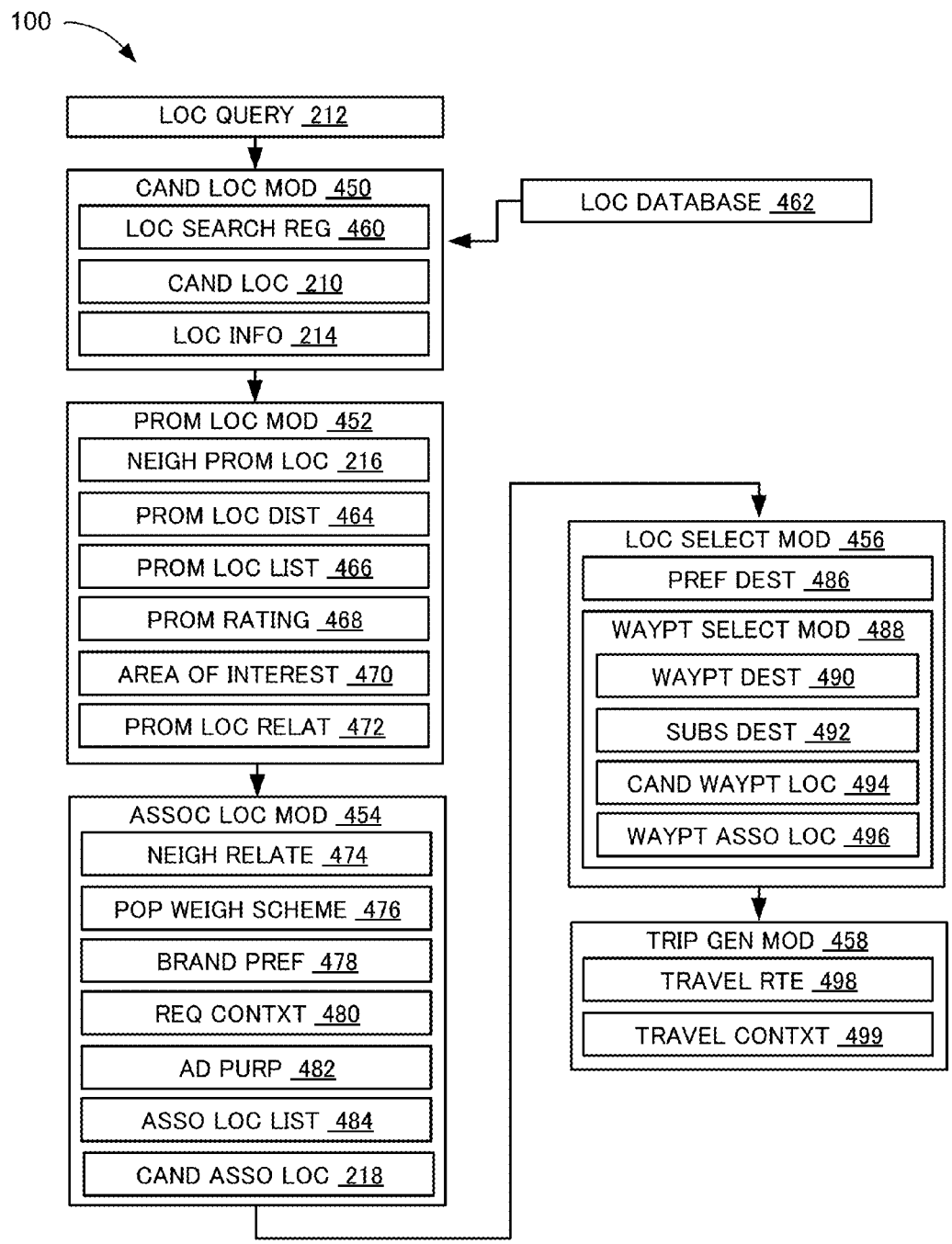
FIG. 4 is a control flow of the navigation system.

Referring now to FIG. 4, therein is shown a control flow of the navigation system 100. The navigation system 100 can include a candidate location module 450, a prominent location module 452, an associated location module 454, a location selection module 456, and a trip generation module 458. The candidate location module 450 can be coupled to the prominent location module 452. The prominent location module 452 can be coupled to the associated location module 454. The location selection module 456 can be coupled to the trip generation module 458.

The candidate location module 450 is for generating a list of locations matching a requested location. The candidate location module 450 can identify and generate a list of the candidate locations 210 based on the location query 212 of the location requestor. For example, the candidate location module 450 can search a location search region 460 for the candidate locations 210. The location search region 460 can be a geographic area determined by a predefined distance or can be explicitly defined by the location requestor. For example, the candidate location module 450 can generate the location search region 460 dynamically based on the location query 212, such as within the city limits for a location query 212 of "the city of San Francisco" or within a few miles of the location requestor for the location query 212 of "near me."

The candidate location module 450 can determine the location information associated with candidate locations 210 in a number of different ways. For example, the candidate location module 450 can access a location database 462, such as an online server or database, that can include the details of the location information 214 associated with each of the candidate locations 210, such as street address, hours of operation, and other details specific to the candidate locations 210.

The prominent location module 452 is for identifying prominent or recognizable locations near the candidate locations 210. The prominent location module 452 can identify the neighboring prominent locations 216 for association with an instance of the candidate locations 210. The prominent location module 452 can identify the neighboring prominent locations 216 in a number of different ways. For example, the prominent location module 452 can identify the neighboring prominent locations 216 based on a prominent location distance 464, which is a distance at which the location requestor can identify the candidate locations 210 from the neighboring prominent locations 216. For example, the prominent location distance 464 can be based on the distance which the location requestor can see the candidate locations 210 from the neighboring prominent locations 216. In another example, the prominent location distance 464 can be based on a specific walking time from the candidate locations 210 to the neighboring prominent locations 216, such as a five minute walk.

In another instance, the neighboring prominent locations 216 can be selected from a prominent location list 466, which is defined as an established list of points of interest. The prominent location list 466 can be a predefined list of known, easily identifiable, or well recognized locations. As an example, the prominent location module 452 can select the neighboring prominent locations 216 from the prominent location list 466 that is closest to one of the candidate locations 210. In another example, the prominent location module 452 can select the neighboring prominent locations 216 from the prominent location list 466 that is within the prominent location distance 464.

In another instance, the neighboring prominent locations 216 can be selected based on a prominence rating 468. The prominence rating 468 is a composite score based on factors, such as popularity and classification or category of the neighboring prominent locations 216. The popularity of the neighboring prominent locations 216 can be based on user-search result actions, such as driving to, calling, or selection of the location. The classification or category can include attractions, such as amusement parks or museums, landmarks, such as schools or libraries, or commerce areas, such as shopping centers or downtown areas. As an example, the popularity can increase the prominence rating 468 for a location that receives a high volume of visitors, phone calls, or click-through navigation, which occur when a user selects the location on a device then travels to the location. In another example, the prominence rating 468 can be higher for more famous or more easily recognized locations, such as the Golden Gate Bridge.

The prominent location module 452 can generate an area of interest 470. The area of interest is defined as an area or region having multiple related points of interest. For example, after determining the prominent location list 466 of one or more of the neighboring prominent locations 216 near the candidate locations 210, the prominent location module 452 can recursively process the prominent location list 466 to determine prominent location relations 472 between the instances of the neighboring prominent locations 216 in the prominent location list 466 to generate the area of interest 470. As a specific example, since the neighboring prominent locations 216 are prominent, the region around the neighboring prominent locations 216 can also be prominent, which can be the area of interest 470.

The prominent location relations 472 can be based on the distances between the different instances of the neighboring prominent locations 216, such as instances of the neighboring prominent locations 216 being within a predetermined distance. For example, since the neighboring prominent locations 216 of AT&T Park and South Beach Park in San Francisco are within 0.5 miles from one another, the prominent location module 452 can include two instances of the neighboring prominent locations 216 as an area of interest 470.

The associated location module 454 is for identifying locations near a requested location that can be of interest to the user. The associated location module 454 can determine the candidate associated locations 218 specific to each instance of the candidate locations 210 for display on the navigation system 100. For example, the associated location module 454 can select the candidate associated locations 218 based on proximity or distance from a particular one of the candidate locations 210. As a specific example, the associated location module 454 can select one or more locations within a predetermine distance from one of the candidate locations 210 including travel time, such as a five or ten minute walking or driving distance from the candidate locations 210, or convenience of travel, such as locations within the same shopping complex or with shared parking lots or structures of the candidate locations 210.

In another specific example, the associated location module 454 can generate a neighboring relationship 474 between the candidate associated locations 218 and the neighboring prominent locations 216, the candidate locations 210, or a combination thereof by calculating the distance from an instance of the candidate associated locations 218 and an instance of the neighboring prominent locations 216 specific to an instance of the candidate locations 210. The associated location module 454 can index the neighboring relationship 474 to the neighboring prominent locations 216, the candidate locations 210, or a combination thereof for using in search & discovery applications.

In another example, the associated location module 454 can execute a recurring process to generate the neighboring relationship 474 between the neighboring prominent locations 216, the candidate locations 210, or a combination thereof, and the candidate associated locations 218, which can be done on an ongoing basis. As a specific example, the associated location module 454 can collect the potential locations for the candidate associated locations 218, such as popular or well-known chain stores, from data mining and previous history or behavior of the location requestor.

In a further example, the associated location module 454 can determine or promote the candidate associated locations 218 based on a popularity weighing scheme 476 by selecting potential locations as the candidate associated locations 218 having a higher value according the popularity weighing scheme 476. As an example, the popularity weighing scheme 494 can include static metrics for the candidate associated locations 218, such as the number of stores and the location distribution of stores.

In another example, the popularity weighing scheme 476 can also be generated by a data-driven approach based on experiences or behavior of the location requestor. As a specific example, the data-driven approach can be based on the drive-to action, defined as the frequency a location is selected and subsequently traveled to, which can provide the highest degree of confidence for the determining the popularity weighing scheme 476. In another specific example, the popularity weighing scheme 476 can be based on the click action, which is the frequency the location is selected or clicked on from a device. In yet another specific example, the drive-to action can have a higher value for the confidence for the popularity weighing scheme 476 than that of the click action.

The associated location module 454 can, in another example, determine the candidate associated locations 218 based on brand preference 478, which is based on the preference of the location requestor. For example the brand preference 478 can be based on personalized preference, a particular category, or driving history of the location requestor. In another example, the brand preference 478 can be determined explicitly, such as asking question directly to the location requestor or through mining from user behavior or history of the location requestor. As a specific example, the brand preference 478 can include "Starbucks," which can be promoted over other brands, such as "Pete's Coffee" or other coffee shops. In another example, if the location requestor prefers the category of "Asian food", the brand preference 478 can include "Asian food," which can be promoted when the associated location module 454 determines the candidate associated locations 218. In a further specific example, the brand preference 478 can include a particular store, such as a local or neighborhood store, that is frequently driven or traveled to by the location requestor which can be presented in a different visual style from the other instances of the candidate associated locations 218.

The associated location module 454 can, in yet a further example, determine the candidate associated locations 218 based on a requestor context 480 of the location requestor. The requestor context 480 can be locations associated with appointments, meetings, or action items for the location requestor, such as the school or daycare center where the location requestor picks up a child, the dental office or hospital at which the location requestor has an appointment, the dry cleaning shop of the location requestor, or other locations specific to the location requestor.

The associated location module 454 can promote the candidate associated locations 218 for an advertising purpose 482. For example, if one of the candidate associated locations 218 is a sponsored location through advertising, the associated location module 454 can promote the candidate associated locations 218 by larger presentation of text or the brand icon 220 or more prominent placement relative to the other instances of the candidate associated locations 218. As another example, the advertising purpose 482 can provide value with deals, coupons, or rewards with the candidate associated locations 218 displayed in a different style, such as a tab or menu option with a dropdown box that displays details of the deals, coupons, or rewards.

The associated location module 454 can generate an associated location list 484 of the candidate associated locations 218. The associated location list 484 can be a ranked list of the candidate associated locations 218 identified by the associated location module 454. The associated location list 484 can be based on the popularity, proximity, advertising, user preference, or a combination thereof. For example, the candidate associated locations 218 closer to the candidate locations 210 or more preferred by the location requestor can have a higher position on the associated location list 484 than the candidate associated locations 218 that are further from the candidate locations 210 or that are less preferred by the location requestor. As another example, the instances of the candidate associated locations 218 with the advertising purpose 482 can have a higher position on the associated location list 484 relative to instances of the candidate associated locations 218 that do not include the advertising purpose 482. The Navigation system 100 can present the candidate associated locations 218 that are higher on the associated location list 484 more prominently than those that are lower on the associated location list 484, such as through visual cues including presenting the brand icon 220 as a larger size.

The navigation system 100 can include a location selection module 456, coupled to the associated location module 454. The location selection module 456 is for receiving a selection of a destination. The location selection module 456 can receive the selection by the location requestor of a preferred destination 486 for travel from one of the presented instances of the candidate locations 210 based on the candidate associated locations 218, the neighboring prominent locations 216, or a combination thereof that are specific to an instance of candidate locations 210. The preferred destination 486 is a location that the location requestor prefers to travel over other similarly presented locations.

As an example, the location selection module 456 can determine an instance of the candidate locations 210 as the preferred destination 486 when the location requestor selects the instance of the candidate locations 210 because the location requestor plans to also travel to one of the candidate associated locations 218 specific to the instance of the candidate locations 210. In another example, the location selection module 456 can determine an instance of the candidate locations 210 as the preferred destination 486 when the location requestor selects the instance of the candidate locations 210 because presence of the neighboring prominent locations 216 or the area of interest 470 will make travel to the specific instance of the candidate locations 210 easier for the location requestor.

The location selection module 456 can include the waypoint selection module 488. The waypoint selection module 488 is for enabling selection of one or more locations based on a previous destination selection. The waypoint selection module 488 can enable the selection of one or more instances of the waypoint destination 490, subsequent destinations 492, or a combination thereof. The waypoint destination 490 is a location that is determined by selection of locations associated with a specific location. The subsequent destinations 492 are locations that are selected follow the selection of the waypoint destination 490.

As an example, the waypoint selection module 488 can determine the waypoint destination 490 from an instance of the candidate locations 210 based on the selection of the candidate associated locations 218 specific to the selected instance of the candidate locations 210. More specifically, the waypoint selection module 488 can determine the instance of the candidate locations 210 as the waypoint destination 490 when the location requestor selects one of the candidate associated locations 218 specific to the instance of the candidate locations 210 as an additional location for travel. As an example, the location requestor can select one of the candidate associated locations 218 as an additional location for travel by touching or clicking on the depiction of specific instance of the candidate associated locations 218 presented by the navigation system 100, such as the brand icon 220. To continue the example, the waypoint selection module 488 can receive the selection of the candidate associated locations 218 and determine the waypoint destination 490 as the instance of the candidate locations 210 that includes the selected instance of the candidate associated locations 218.

The waypoint selection module 488 can determine the subsequent destinations 492 based on location selections concurrent with or subsequent to that determination of the waypoint destination 490. For example, when the waypoint selection module 488 determines the waypoint destination 490 as the instance of the candidate locations 210 that includes the selected instance of the candidate associated locations 218, as in the immediately preceding example, the waypoint selection module 488 can determine the selected instance of the candidate associated locations 218 as the subsequent destinations 492.

Alternatively, for example, the waypoint selection module 488 can determine the selected instance of the candidate associated locations 218 as a candidate waypoint location 494. Similar to the presentation of the candidate associated locations 218 with the candidate locations 210, the navigation system 100 can present the candidate waypoint location 494 with a waypoint associated location 496. The waypoint selection module 488 can determine the subsequent destinations 492 as selected instances of the candidate waypoint locations 494 that the location requestor intends to visit on the same trip as the waypoint destination 490. The waypoint selection module 488 can continue with presentation of additional sets of the waypoint associated locations 496 until the location requestor indicates no further destinations are to be traveled to on the particular trip.

The trip generation module 458 is for calculating a route or itinerary based on selected destinations, waypoints, or a combination thereof. The trip generation module 458 can calculate a travel route 498 based on the preferred destination 486, the selected instance of the candidate associated locations 218, the waypoint destination 490, the subsequent destinations 492, or a combination thereof, based on whether the waypoint destination 490 or the subsequent destinations 492 were selected by the location requestor. For example, the trip generation module 458 can calculate the travel route 498 to include the waypoint destination 490 and the selected instance of the candidate associated locations 218 when the waypoint selection module 488 did not receive a selection of instances of the subsequent destinations 492. In another example, the trip generation module 458 can calculate the travel route 498 to only the preferred destination 486 when the waypoint selection module 488 did not receive a selection of an instance of the candidate associated locations 218 or the subsequent destinations 492.

The trip generation module 458 can calculate the travel route 498 in the order or sequence each instance of the waypoint destination 490 and subsequent destinations were selected. Alternatively, the trip generation module 458 can calculate the travel route 498 based on travel context 499, such as traffic, the shortest total travel time, shortest distance between the waypoint destination 490, the selected instance of the candidate associated locations 218, the subsequent destinations 492, or a combination thereof. In yet another example, the trip generation module 458 can generate the travel route 498 to synchronize with, accommodate, or match the schedule or appointments of the location requestor.

It has been discovered that associating or displaying the neighboring prominent locations 216 specific to an instance of the candidate locations 210 can be helpful or useful to the location requestor when the location requestor is new to or unfamiliar with the area. It has also been discovered that presenting the neighboring prominent locations 216 with the candidate locations 210 can help generate or build contextual relevance pertaining to the candidate locations 210 for the location requestor.

It has further been discovered that presenting the candidate associated locations 218 with the brand icon 220 can generate an intuitive user interface. The brand icon 220 can aid or facilitate the location requestor in quickly identifying the candidate associated locations 218 which allows for the intuitive user interface.

It has further been discovered that the candidate associated locations 218 provides rich content that enhances the selection of the preferred destination 486 for the location requestor. Presenting the candidate associated locations 218 specific to the candidate locations 210 assists the location requestor to select one of the candidate locations 210 as the preferred destination 486 and provides insightful information that empowers the location requestor to plan the visit to the location query 212, which enhances the selection of the preferred destination 486.

It has also been discovered that presentation of the candidate locations 210 with the candidate associated locations 218, the neighboring prominent locations 216, or a combination thereof improves efficiency in planning the travel route 498. Presenting the candidate associated locations 218, the neighboring prominent locations 216, or a combination thereof specific to the instance of the candidate locations 210 eliminates the separate or additional step of searching for the candidate associated locations 218 or the neighboring prominent locations 216, which improves efficiency in planning the travel route 498.

It has further been discovered that the neighboring prominent locations 216 can be linked to each other by the prominent location relations 472, such as through geolocation, and can be leveraged through the linkage between the prominent location relations 472 to provide more useful information to the location requestor. Further, it has been discovered that the neighboring prominent locations 216 and the area of interest 470 prevents ambiguity during travel due to easy recognition of the neighboring prominent locations 216 and the area of interest 470.

It has yet further been discovered that promoting the candidate associated locations 218 associated with advertising increases the effectiveness of the advertising. The candidate associated locations 218 associated with the advertising is location related with the candidate destination which efficiently increases the chance that the location requestor visit the candidate associated locations 218 associated with advertising when the location requestor visits the candidate locations 210 associated with the candidate associated locations 218.

The first software 326 of FIG. 3 of the first device 102 of FIG. 3 can include the modules for the navigation system 100. For example, the first software 326 can include the candidate location module 450, the prominent location module 452, the associated location module 454, the location selection module 456, and the trip generation module 458. The first user interface 318 of FIG. 3 can be implemented by the navigation system 100 to receive the location query 212.

The first control unit 312 of FIG. 3 can execute the first software 326 to implement the candidate location module 450, the prominent location module 452, the associated location module 454, the location selection module 456, and the trip generation module 458. For example, the first control unit 312 can be configured to implement the candidate location module 450 to determine the candidate locations 210. As another example, the first control unit 312 can be configured to implement the prominent location module 452 to determine the neighboring prominent locations 216. In a further example, the first control unit 312 can be configured to implement the associated location module 454 to determine the candidate associated locations 218. In yet a further example, the first control unit 312 can be configured to implement the location selection module 456, including the waypoint selection module 488, to determine the preferred destination 486, the waypoint destination 490, the selected instance of the candidate associated locations 218, the candidate waypoint location 496, or a combination thereof.

The first control unit 312 can be configured to implement the trip generation module 458 to calculate the travel route 498 including the waypoint destination 490, the selected instance of the candidate associated locations 218, the candidate waypoint location 496, the preferred destination 486, or a combination thereof. The first control unit 312 can be configured to interface with the first display interface 208 to display the travel route 498 on the first device 102.

The second software 342 of FIG. 3 of the first device 102 can include the modules for the navigation system 100. For example, the second software 342 can include the candidate location module 450, the prominent location module 452, the associated location module 454, the location selection module 456, and the trip generation module 458. The second user interface 338 of FIG. 3 can be implemented by the navigation system 100 to receive the location query 212.

The second control unit 334 of FIG. 3 can execute the second software 342 to implement the candidate location module 450, the prominent location module 452, the associated location module 454, the location selection module 456, and the trip generation module 458. For example, the second control unit 334 can be configured to implement the candidate location module 450 to determine the candidate locations 210. As another example, the second control unit 334 can be configured to implement the prominent location module 452 to determine the neighboring prominent locations 216. In a further example, the second control unit 334 can be configured to implement the associated location module 454 to determine the candidate associated locations 218. In yet a further example, the second control unit 334 can be configured to implement the location selection module 456, including the waypoint selection module 488, to determine the preferred destination 486, the waypoint destination 490, the selected instance of the candidate associated locations 218, the candidate waypoint location 496, or a combination thereof.

The second control unit 334 can be configured to implement the trip generation module 458 to calculate the travel route 498 including the waypoint destination 490, the selected instance of the candidate associated locations 218, the candidate waypoint location 496, the preferred destination 486, or a combination thereof. The second control unit 334 can be configured to interface with a display interface to display the travel route 498 on the first device 102.

The modules of the navigation system 100 can be partitioned between the first software 326 and the second software 342. For example, the first software 326 can include the candidate location module 450, the prominent location module 452, the associated location module 454, and the location selection module 456. Based on the size of the first storage unit 314 of FIG. 3, the first software 326 can include additional modules of the navigation system 100. The first control unit 312 can execute the modules partitioned on the first software 326 as previously described. The first control unit 321 can implement the first display interface 208, the location unit 320, the first storage unit 314, or first communication unit 316 as previously described above.

The second software 342 can include the trip generation module 458. The second control unit 334 can execute modules partitioned on the second software 342 as previously described. The second control unit 334 can implement the second control unit 334 can implement the other hardware units, such as the second display interface 208, the second storage unit 346, or the second communication unit 336 as previously described above.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

The physical transformation from determining the neighboring prominent location 216 or the candidate associated locations 218 for displaying on the first device 102, the second device 106, or a combination thereof results in the movement in the physical world, such as the location requestor traveling to the instance of the candidate locations 210 near the neighboring prominent location 216 or the candidate associated locations 218. As the movement in the physical world occurs, such as the location requestor traveling along the travel route to the candidate locations 210, the movement itself creates additional information that is converted back into the popularity weighing scheme 476 for the instance of the candidate associated locations 218 for continued operation of the navigation system 100 and to continue the movement in the physical world.

Figure 5:
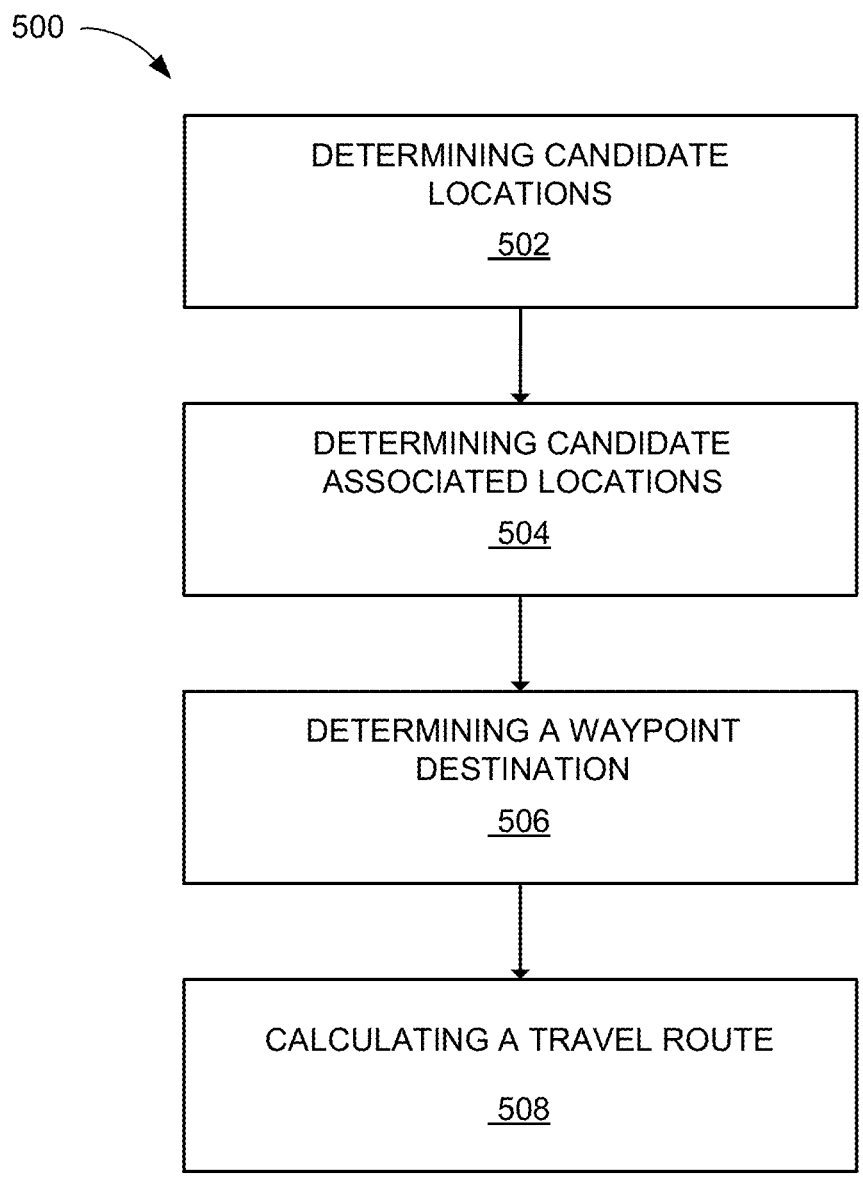
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: determining candidate locations for the location query in a block 502; determining a candidate associated location specific to each of the candidate locations in a block 504; determining a waypoint destination from an instance of the candidate locations based on a selected instance of the candidate associated location specific to the instance of the candidate locations in a block 506; and calculating a travel route including the waypoint destination and the selected instance of the candidate associated location for displaying on a device in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
   a user interface configured to receive a location query for a retail location from a location requestor;
   a control unit, coupled to the user interface, configured to:
      determine candidate locations for the location query;
      determine a candidate associated location, specific to each of the candidate locations, based on the frequency the candidate associated location is selected on a device and subsequently traveled to;
      generate a list of the candidate locations matching the retail location, wherein the list includes the candidate associated location for each of the candidate locations;
      determine a waypoint destination from an instance of the candidate locations based on a selected instance of the candidate associated location specific to the instance of the candidate locations; and
      calculate a travel route including the waypoint destination and the selected instance of the candidate associated location for displaying on the device; and
      calculate a popularity weighing scheme for the selected instance of the candidate associated location based on travel of the location requestor along the travel route to the selected instance of the candidate associated location.

2. The system as claimed in claim 1 wherein the control unit is configured calculate the popularity weighing scheme of the selected instance of the candidate associated location based on the frequency the candidate associated location is selected.

3. The system as claimed in claim 1 wherein the control unit is configured to determine a landmark near each of the candidate locations.

4. The system as claimed in claim 1 wherein the control unit is configured to determine the candidate associated location based on an adverting purpose of the candidate associated location.

5. The system as claimed in claim 1 wherein the control unit is configured to:
   determine a subsequent destination; and
   calculate the travel route including the waypoint destination, the subsequent destination, and the selected instance of the candidate associated location.

6. The system as claimed in claim 1 wherein the control unit is configured to determine the candidate associated location based on a requestor context.

7. The system as claimed in claim 1 wherein the control unit is configured to determine the candidate associated location based on a brand preference.

8. The system as claimed in claim 1 wherein the control unit is configured to calculate the travel route based on travel context.

9. The system as claimed in claim 1 wherein the control unit is configured to present the candidate associated location as a brand icon of the candidate associated location.

10. The system as claimed in claim 1 wherein the control unit is configured to determine the candidate locations based on a search of a location search region.

11. A method of operation of a navigation system comprising:
   determining candidate locations for a location query for a retail location from a location requestor;
   determining a candidate associated location, specific to each of the candidate locations, based on the frequency the candidate associated location is selected on a device and subsequently traveled to;
   generating a list of the candidate locations matching the retail location, wherein the list includes the candidate associated location for each of the candidate locations;
   determining a waypoint destination from an instance of the candidate locations based on a selected instance of the candidate associated location specific to the instance of the candidate locations; and
   calculating a travel route including the waypoint destination and the selected instance of the candidate associated location for displaying on the device; and calculating a popularity weighing scheme for the selected instance of the candidate associated location based on travel of the location requestor along the travel route to the selected instance of the candidate associated location.

12. The method as claimed in claim 11 wherein calculating the popularity weighing scheme of the selected instance of the candidate associated location is based on the frequency the candidate associated location is selected.

13. The method as claimed in claim 11 further comprising determining a landmark near each of the candidate locations.

14. The method as claimed in claim 11 wherein determining the candidate associated location includes determining the candidate associated location based on an adverting purpose of the candidate associated location.

15. The method as claimed in claim 11 further comprising:
   determining a subsequent destination; and
   wherein calculating the travel route includes the waypoint destination, the subsequent destination, and the selected instance of the candidate associated location.

16. A non-transitory computer readable medium including instructions for operating a navigation system comprising:
   determining candidate locations for a location query for a retail location from a location requestor;
   determining a candidate associated location, specific to each of the candidate locations, based on the frequency the candidate associated location is selected on a device and subsequently traveled to;
   generating a list of the candidate locations matching the retail location, wherein the list includes the candidate associated location for each of the candidate locations;
   determining a waypoint destination from an instance of the candidate locations based on a selected instance of the candidate associated location specific to the instance of the candidate locations; and
   calculating a travel route including the waypoint destination and the selected instance of the candidate associated location for displaying on the device; and
   calculating a popularity weighing scheme for the selected instance of the candidate associated location based on travel of the location requestor along the travel route to the selected instance of the candidate associated location.

17. The non-transitory computer readable medium as claimed in claim 16 wherein calculating the popularity weighing scheme of the selected instance of the candidate associated location is based on the frequency the candidate associated location is selected.

18. The non-transitory computer readable medium as claimed in claim 16 further comprising determining a landmark near each of the candidate locations.

19. The non-transitory computer readable medium as claimed in claim 16 wherein determining the candidate associated location includes determining the candidate associated location based on an adverting purpose of the candidate associated location.

20. The non-transitory computer readable medium as claimed in claim 16 further comprising:
   determining a subsequent destination; and
   wherein calculating the travel route includes the waypoint destination, the subsequent destination, and the selected instance of the candidate associated location.

* * * * *